US006905636B2

(12) United States Patent
Yuan et al.

(10) Patent No.: US 6,905,636 B2
(45) Date of Patent: Jun. 14, 2005

(54) METHOD FOR THE PRODUCTION OF EUROPIUM ACTIVATED YTTRIUM GADOLINIUM BORATE PHOSPHOR PARTICLES

(75) Inventors: Ximing Yuan, Hubei (CN); Yongsheng Xu, Hubei (CN); Yongqian Wang, Hubei (CN); Jihong Zhang, Hubei (CN)

(73) Assignee: China University of Geosciences (Wuhan), Wuhan (CN)

( * ) Notice: Subject to any disclaimer, the term of this patent is extended or adjusted under 35 U.S.C. 154(b) by 0 days.

(21) Appl. No.: 10/421,055

(22) Filed: Apr. 22, 2003

(65) Prior Publication Data

US 2003/0230740 A1 Dec. 18, 2003

(51) Int. Cl.⁷ .......................... C09K 11/63; C09K 11/78
(52) U.S. Cl. .............................................. 252/301.4 R
(58) Field of Search ................................. 252/301.4 R

(56) References Cited

U.S. PATENT DOCUMENTS

| 5,846,511 A | * | 12/1998 | Kim et al. .................. 423/610 |
| 5,979,461 A | * | 11/1999 | Bensalem et al. ........... 131/365 |
| 6,042,747 A | * | 3/2000 | Rao ..................... 252/301.4 R |
| 6,409,983 B1 | * | 6/2002 | Choi et al. .................. 423/598 |
| 6,692,660 B2 | * | 2/2004 | Kumar ................ 252/301.4 R |

FOREIGN PATENT DOCUMENTS

WO     WO 99/38186     7/1999

* cited by examiner

Primary Examiner—C. Melissa Koslow
(74) Attorney, Agent, or Firm—Blakely, Sokoloff, Taylor & Zafman; Stephen M. De Klerk

(57) ABSTRACT

The present invention relates to a method for producing europium activated yttrium gadolinium borate phosphors and a product produced by the method. The chemical formula of said phosphors is $(Y_{1-x-y-z}Eu_xGd_yM_z)BO_3$, wherein: $0.01 \leq x \leq 0.01$, $0 \leq y \leq 0.5$, M=Ca, Sr, Ba or Mg, $0 \leq z \leq 0.1$. The method comprises: mixing a yttrium source, an europium source, a gadolinium source, a boron source and an M source to produce an aqueous solution in a microwave system; placing the aqueous solution into a microwave system, and making the solution reacting under the condition of condensation cycling and stirring to produce a sol; heating the sol in a microwave system to produce a gel; drying, baking, washing and collecting the gel to produce the product. The method of the present invention can greatly short the production period and improve the production efficiency. The europium activated yttrium gadolinium borate phosphor particles is of a particle size as fine as 80 nm and has good uniformity and emitting performance.

12 Claims, 2 Drawing Sheets

METHOD FOR THE PRODUCTION OF EUROPIUM ACTIVATED YTTRIUM GADOLINIUM BORATE PHOSPHOR PARTICLES

CROSS-REFERENCE TO OTHER APPLICATIONS

This Application claims priority from P.R. China Patent Application No. 02115978.5, filed on Jun. 14, 2002.

FIELD OF THE INVENTION

The present invention relates to a method for the production of europium activated yttrium gadolinium borate phosphor particles used in manufacturing plasma display panels, compacted fluorescence lamps etc.

BACKGROUND OF THE INVENTION

Being comparable with liquid crystal displays (LCD), a typical flat panel displays such as plasma display panel (PDP) has good developing perspective. In PDPs, the key material is an efficient phosphor, and the key techniques to realize its industrial production are how to produce this efficient phosphor particles, how to enlarge the emitting area of luminescence particles and how to improve the brightness, color purity, definition and color displaying quality.

Europium activated yttrium gadolinium borate phosphor particles can be used in PDPs. In the prior art, these phosphors are prepared by a high temperature solid state reaction. This method has many technical disadvantages. For example, this method consumes much energy during preparation, and the coarser grain size of phosphor powders prepared by this method is in the range of 5 to 10 microns and the particle size distribution is not uniform, making the quality of coating screen low. The above method is prone to forming a non-uniformity of dispersion, whereby influencing the emitting efficiency.

WO99/38186 of Panasonic Electronic Co. (Japan) discloses an improved method for the production of europium activated yttrium gadolinium borate phosphors, this publication is incorporated herein by reference entirely. In this method, fine grain size of phosphor particles were synthesized by sol-gel process. This method comprises the formation of a sol and/or gel by the reaction of, in an acidic solution, organic precursors containing yttrium, gadolinium, alkaline earth metals, europium and boron; and thermally decomposing the gel at a temperature lower than the temperature of the solid phase reaction. By contrast with the high temperature solid state reaction, this method has the advantages of improving the particles shape and uniformity and decreasing the particle size. However, this method still has the disadvantages of longer preparation period (5–6 days), and coarser particle sizes (0.1–2.0 micron), which are not fine enough.

The main object of the present invention is to overcome the above-mentioned shortcomings and to provide a method for producing europium activated yttrium gadolinium borate phosphor particles with the advantages of shortening the production period, increasing the production efficiency, further decreasing the particle size and improving the product uniformity. With fine particles in production of PDP screens, it is easy to form thin fluorescence screens, increase the specific surface of phosphor particles and improve the emitting performance.

SUMMARY OF THE INVENTION

One object of the present invention is to provide an improved method for the production of europium activated yttrium gadolinium borate phosphors based on the prior art. With the method of the present invention, the production period is shorter, and the chemical uniformity, purity and particle size (the particle size can be fined to 80 nm) of the product are improved to make the emitting performance better.

Another object of the present invention is to provide an europium activated yttrium gadolinium borate phosphors (particle size at nm level) produced by the method of the present invention.

According to one aspect of the present invention, it provides a method for the production of europium activated yttrium gadolinium borate phosphors with a chemical formula of $(Y_{1-x-y-z}Eu_xGd_yM_z)BO_3$ wherein: $0.01 \leq x \leq 0.1$, $0 \leq 0.5$, M=Ca, Sr, Ba or Mg, $0 \leq z \leq 0.1$, the method comprises:

(1) mixing a yttrium source, an europium source, a gadolinium source, a boron source and an M source to produce an aqueous solution according to an atom ratio of Y: Eu: Gd: M: B=(8–32): 1: (1–6): (0–2.4): (1–16);

(2) putting the aqueous solution obtained in step (1) into a microwave synthesis system, and making the solution reacting under the condition of condensation cycling and stirring for 6–10 hours to produce a sol;

(3) heating the sol obtained in step (2) to obtain a gel;

(4) drying the gel obtained in step (3);

(5) calcining the dried gel obtained in step (4) at a temperature of 200–500° C. for 1–4 hours to remove the organic material therein, then baking at a temperature of 700–1000° C. for 4–8 hours to produce a semi-finished product of phosphors;

(6) washing the semi-finished phosphor product obtained in step (5) with water;

(7) collecting the product.

According to the method of the present invention, the said yttrium source, europium source and gadolinium source in the step (1) are their oxides, hydrates, chlorides or nitrates respectively, and the oxides or nitrates are preferable. Said M source is chloride or nitrate of Ca, Sr, Ba or Mg, preferably nitrate of Ca or Mg. Said boron source is boric acid and/or trimethyl borate, preferably a mixture of trimethyl borate and boric acid. When the mixture of trimethyl borate and boric acid is used, the mole ratio of trimethyl borate to boric acid is in the range of (1–10): (0.5–5), preferably in the range of (1–5): (1–3).

According to the method of the present invention, the said mixing in step (1) is carried out at a temperature of 60–95° C., and preferably in a ultrasonic wave system.

There is no special limitation on the microwave power in step (2) of the method of the present invention. The suitable microwave power is in the range of 400–3600 W, preferably in the range of 800–2500 W.

According to the method of the present invention, the said heating in step (3) can be carried out by conventional heating methods. It is preferably carried out in a microwave system. In this case, there is no special limitation on the microwave power, but preferably at lower power, for example, at 400 to 1500 W.

According to the method of the present invention, there is no special limitation on the means for carrying out the said drying in step (4). It can be carried out, for example, in a normal oven, in airflow, by far infrared radiation, etc., provided that the water content of the resulted gel is less than 2.0% by weight.

According to the method of the present invention, the said calcining in step (5) is preferably performed with a programmed temperature-increasing process, and the temperature gradient should be lower to prevent product particles from growing up due to conglomeration.

According to the method of the present invention, the said washing in step (6) can be a normal slurry-making washing, but preferably under a condition of the presence of a dispersant to prevent product particles from growing up due to conglomeration. Said dispersant include ethanol, propanol, butanol, etc. More preferably, said washing is carried out under an ultrasonic wave condition, since this is benefit for dispersing particles and avoiding conglomeration. The condition of said washing can be, for example, temperature being from room temperature to 50° C., weight ratio of solid to liquid being 1: (3–15), and washing time being 5–60 minutes.

According to another aspect of the present invention, it provides an europium activated yttrium gadolinium borate phosphors produced by the method of the present invention.

The present invention provides an improved method to produce europium activated yttrium gadolinium phosphors. According to the present invention, the production procedures are optimized by combing a sol-gel method with a microwave method and an ultrasonic method. A microwave radiation technique and an ultrasonic dispersion technique are applied to convert a sol to a gel, to dry the gel and to make crystallization. This keeps the advantages of fine particle size and uniform dispersion of product by sol-gel process, and also takes the advantage of speedy and efficient characteristic of the microwave method, thus greatly shorten the entire sol-gel process. Furthermore, this also efficiently prevents rare earth metals ions in a individual sol-gel process from forming agglomerates such that it is benefit for increasing the concentration of uniformly dispersed rare earth metals ions on a emitting centers. Also, it is efficient for preventing product particles from agglomeration such that product particles keep fine and uniform to improve the emitting performance. Europium activated yttrium gadolinium borate phosphors with good properties such as purity, looseness, dispersion, particle size and emitting can be prepared by the method of the present invention. The temperature for producing phosphors by the method of the present invention is lower than that of the conventional high temperature solid state method. Compared with the method disclosed in WO99/38186, the production period of the method of the present invention is greatly shorten and producing efficiency is improved, resulting in a lower production cost. Additionally, the particles made by the method of the present invention are much finer and more uniform, and the particle size can be as fine as 80 nm and its emitting performance is excellent. Particularly, it is suitable for production in an industrial scale. The phosphors made by method of the present invention can be applied to the production of PDP screen, compacted fluorescent lamp, game machine, neon light, etc.

DETAILED DESCRIPTION OF THE PREFERRED EMBODIMENTS

The preferred embodiments of the present invention will be described hereinafter. It should be understood for those skilled in the art that these embodiments are only for describing the present invention, but not for limiting the scope of the present invention.

EXAMPLE 1

587.69 g $Y_2O_3$ (purity: 99.99% by weight), 110.77 g $Gd_2O_3$ (purity: 99.99% by weight) and 40.92 g $Eu_2O_3$ (purity: 99.99% by weight) were put into a beaker respectively. Then 1.5 liters of 1:1 nitric acid was added thereto. The resulted mixture was put into an ultrasonic water bath, and the raw materials were stirred to dissolve under an ultrasonic wave. During stirring, 200.31 g boric acid ($HBO_3$) (purity: 99.9% by weight) was added followed by adding 4.5 liters distilled water and 558.85 ml trimethyl borate (purity: 99.9% by weight). With the temperature of water bath controlled at 80° C., an uniform solution was prepared by stirring at this constant temperature for 0.08 hour. Then the solution was poured into a three-necks flask and put into a microwave synthesis system (MMR-12 Micro SYNTH, ETHOS Co., Italy) and stirred at a speed of 120 rpm, microwave power of 1600 W under flux condensation for 8 hours, leading to the formation of a sol. Then the sol was transferred into an opening container and placed in a microwave oven, heated at a low fire power for 0.5 hour to produce a dry gel. The dry gel was put into an infrared oven and heated at 50° C.–130° C. for 12 hours to remove the water. Then the dried product was put into a muffle furnace. The temperature was increased at a ramp of 5° C./min at the first 5 minutes and kept at this temperature for 2 hours to remove the organic materials, and the temperature was finally increased to 900° C. and kept at this temperature to calcine for 6 hours, leading to the formation of a gel. After the calcined product was cooled, it was dispersed into 8.0 liters water containing 500 ml ethanol as a dispersant and put into an ultrasonic water bath to wash at 60° C. for 20 minutes. After filtration, the same washing procedure was repeated for one more time. The washed product was then put into a drying oven to dry and remove the alcohol. The final product was obtained after grinding the gel by an airflow mill, i.e., to blow off the soft crust of gel by strong airflow during preparation. Table 1 showed the elemental composition analyzed by an atomic absorption spectrometry of the obtained phosphors.

TABLE 1

| Elements | Content, % by weight |
| --- | --- |
| Y | 48.16 |
| Gd | 10.03 |
| Eu | 4.84 |
| B | 6.37 |
| C | 0.00 |
| H | 0.00 |
| N | 0.00 |
| O | 30.60 |

Figure 1:
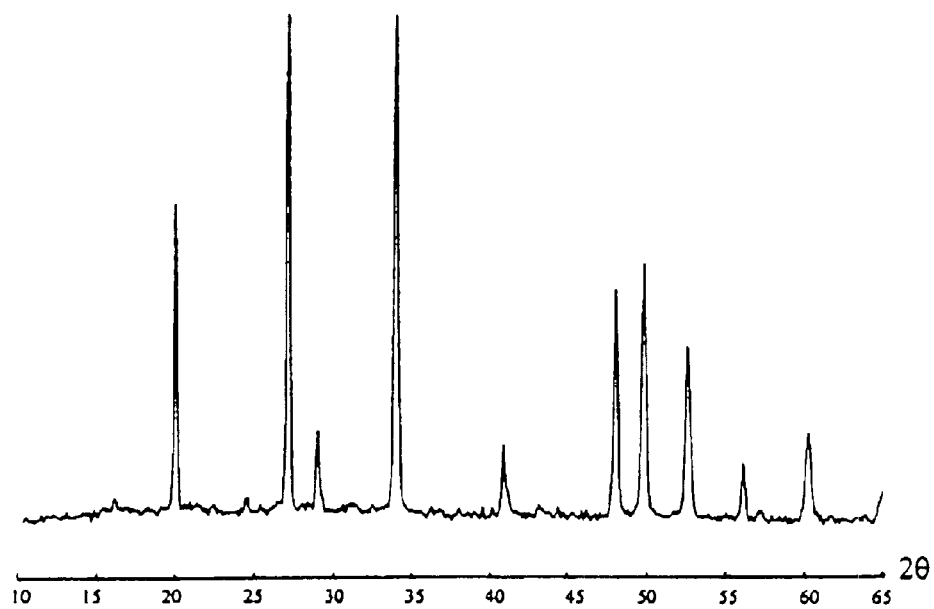
FIG. 1 shows an X-ray diffraction (XRD) pattern of the phosphor powders obtained in example 1 of the present invention.

The X-ray diffraction (XRD) pattern of the resulted phosphor powder was shown in FIG. 1 (the instrument used was a RIGAKU D/Max-3B diffractometer).

An image of the phosphor powder obtained by a transmission electron microscopy (TEM)(space resolution: 34 nm) has shown that the average particle size was about 80 nm.

EXAMPLES 2–5

The same procedure of Example 1 were repeated to produce europium activated yttrium gadolinium borate phosphor powders, except that the solution was stirred to react under flux condensation for 2, 4, 6, 8 and 10 hours respectively.

EXAMPLE 6

1.08 g Yttrium nitrate (purity: 99.99% by weight), 0.0638 g gadolinium nitrate (purity: 99.99% by weight), 0.0221 g europium nitrate (purity: 99.99% by weight) and 0.0460 g magnesium nitrate (purity: 99.99% by weight) were put into a beaker respectively, then 1000 ml water was added therein. The resulted mixture was put into an ultrasonic water bath, and stirred until the solids were dissolved. During stirring, 12 ml trimethyl borate (purity: 99.99% by weight) was added followed by adding a 0.6M aqueous solution of boric acid (containing 0.1085 gram of boric acid). With the temperature of water bath controlled at 80° C., an uniform solution was prepared by stirring at the constant temperature for 0.2 hour. Then the solution was poured into a three-necks flask, and the flask was placed in a microwave synthesis system (MMR-12 Micro SYNTH, sold by Italian ETHOS Co., Italy) and stirred under flux condensation at a microwave power of 1600 W and a rotation speed of 120 rpm for 8 hours, leading to the formation of a sol. Then the sol was transferred into an opening container and placed in a microwave oven to be heated at a low fire power (450 W) for 0.3 hour to convert the sol into a dry gel. The dry gel was put in an infrared oven to be dried at 50° C.–130° C. for 2 hours to remove the water. Then the dried product was put into a muffle furnace and heated at a ramp 5° C./min to 350° C. and kept at this temperature for 2 hours to remove organic materials, then the temperature was increased to 900° C. and kept at this temperature for 5 hours. After the baked product was cooled, it was dispersed in water with alcohol as a dispersant and put into a ultrasonic water bath at 60° C. for 20 minutes. After filtration, the washing procedure was repeated for one more time. The washed product was then put in a drying oven and dried to remove the alcohol. The final product was obtained after gringing by an air flowmill. Table 2 listed the results of the element analysis (atomic absorption spectrometry) of the product.

TABLE 2

| Elements | Content, % by weight |
|---|---|
| Y | 46.80 |
| Gd | 9.97 |
| Eu | 4.82 |
| Mg | 1.12 |
| B | 6.85 |
| C | 0.00 |
| H | 0.00 |
| N | 0.00 |
| O | 30.44 |

Figure 2:
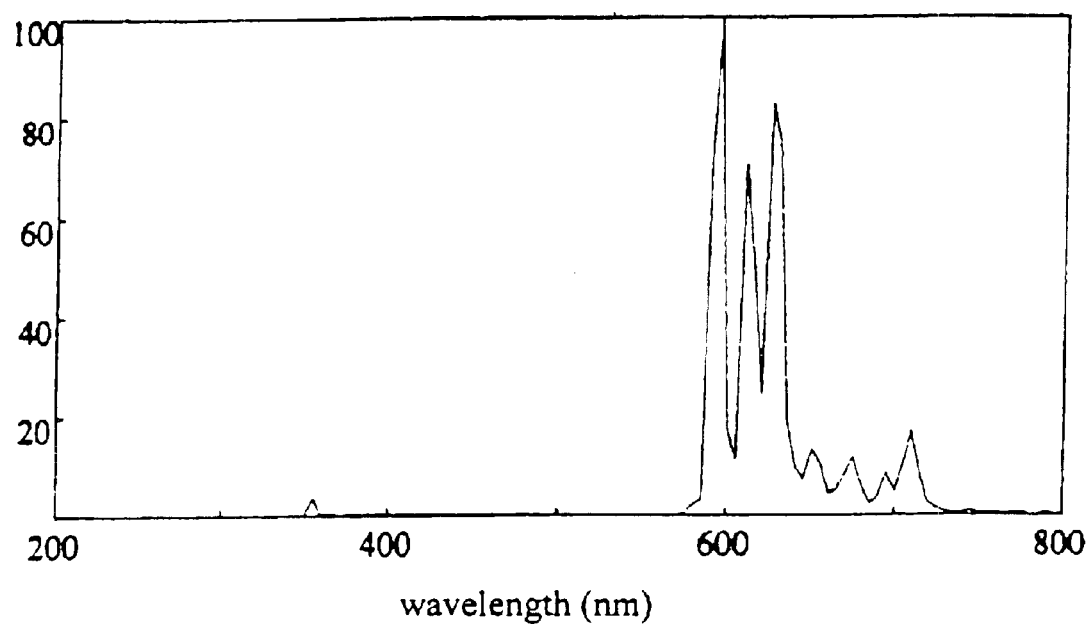
FIG. 2 shows an emission spectrum of the phosphor powders obtained in example 1 of the present invention at the excitation wavelength 147 nm (vacuum: $10^{-5}$ torr)

The emitting performance of the commercial products available from the market and those obtained from Examples 1–6 were tested respectively with a PDP-VUV Fluorescence Specfroradiometric System, Tricolor Instrument Co. Ltd. of Zhejiang University. The application performances were tested under the following conditions: excitation wavelength 147 nm, vacuum $10^{-5}\tau$, emission spectrum range 350 nm–800 nm, electrically autofeeding sample disc, evacuating rate of the test chamber 6 min/time, bichannel synchronous sampling, software trigger or external signal trigger. Table 3 listed the results of relative emitting intensity, and FIG. 2 shows the emitting performance.

TABLE 3

| Phosphors | Relative intensity Activation (147 nm) | | | Particle size (nm) |
|---|---|---|---|---|
| | 627 nm | 611 nm | 593 nm | |
| Example 1 | 70.05 | 62.63 | 100.00 | 80 |
| Example 2 | 68.54 | 60.08 | 91.83 | 120 |
| Example 3 | 69.36 | 61.72 | 96.46 | 90 |
| Example 4 | 70.15 | 62.32 | 98.00 | 80 |
| Example 5 | 68.60 | 60.10 | 92.00 | 200 |
| Example 6 | 69.21 | 61.63 | 95.00 | 300 |
| Commercial product 1 ($Y_2Gd)BO_3$:Eu | 51.33 | 45.58 | 86.63 | 2100 |
| Commercial product 2 $Y_2O_3$:Eu | 40.57 | 35.76 | 67.38 | 3500 |

Note: Commercial products 1 and 2 were the phosphors use in PDP.

Figure 3:
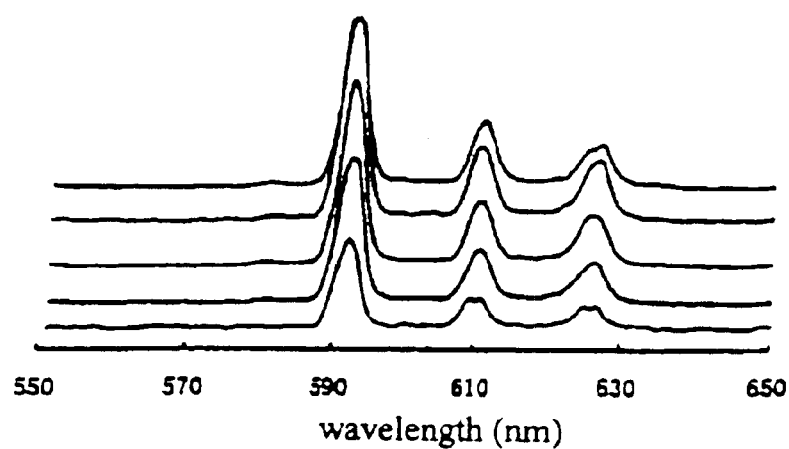
FIG. 3 shows the emission spectrum of the phosphor powders obtained in example 1–5 of the present invention at the excitation wavelength 234 nm (vacuum: $10^{-5}$ torr)
Figure 4:
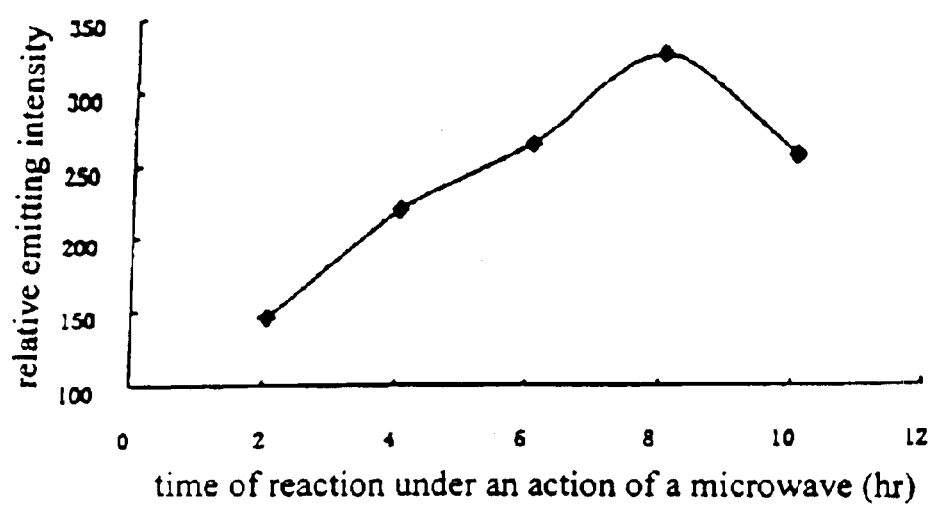
FIG. 4 shows the effect of microwave reaction time on relative emitting intensity.

It could be seen from Table 3, FIG. 3 and FIG. 4 that the relative emitting intensity increased with the time of reaction under an action of a microwave from 2 hours to 8 hours. The relative emitting intensity corresponding to 8 hours of reaction time was up to 324.8, but significantly decreased when the reaction time was 10 hours, resulting in a blue displacement phenomenon. The average particle size of the product corresponding to the optimum reaction time was 80 nm. The effects of reaction time on the relative emitting intensity were shown in FIG. 3 and FIG. 4.

The preparation temperature of the method of the present invention is much lower than that of the high temperature solid state method. By comparison with the method disclosed in WO 99/38186 of Panasonic Electronic Co., the method of the present invention greatly shortens the preparation time and significantly improves the preparation efficiency, and the phosphor particles prepared by the method of the present invention are very fine and uniform, which are suitable for screen making technique. The emitting performance can be improved since the specific surface of phosphor particles is increased due to the finer particles.

In comparison with commercial products with particle sizes about 2.1 microns to 3.5 microns, the particle size of the product of the present invention is fine and uniform, ranged from 80 nm to 300 nm, in which the minimum is 80 nm. The emitting intensity of the product of the present invention is greatly increased, and the emitting performance is significantly improved. The product of the present invention is prone to be applied in PDPs screen making technique to form a thin screen. Therefore, the product of the present invention has a broad market perspective.

What is claimed is:

1. A method for producing nano-scale europium activated yttrium gadolinium phosphor particles with fine granularity having an empirical formula of $(Y_{1-x-y-z}Eu_xGd_yM_z)BO_3$, wherein: $0.01 \leq x \leq 0.1$, $0 \leq y \leq 0.5$, M=Ca, Sr, Ba or Mg, $0 \leq z \leq 0.1$, the method adopting the technique which combines a sol-gel method with a microwave radiation method, in order to prevent rare earth metals ions from forming agglomerates and increase the concentration of uniformly dispersed rare earth metals ions on emitting centers, further decreasing the particle size to nano-scale and improving the product performances, comprising:

(1) mixing a yttrium source, an europium source, a gadolinium source, a boron source and an M source to produce an aqueous solution according to an atom ratio of Y: Eu: Gd: M: B=(8–32): 1: (1–6): (0–2.4): (1–16);

(2) putting the aqueous solution obtained in step (1) into a microwave synthesis system, and making the solution reacting under the condition of condensation cycling and stirring for 6–10 hours to produce a sol;

(3) heating the sol obtained in step (2) to produce a gel;

(4) drying the gel obtained in step (3);

(5) calcining the dried gel obtained in step (4) at a temperature of 200–500° C. for 1–4 hours to remove the organic material therein, then baking at a temperature of 700–1000° C. for 4–8 hours to produce a semi-finished phosphor product;

(6) washing the semi-finished phosphor product obtained in step (5) with water; and (7) collecting the product.

2. The method of claim 1, wherein said yttrium source, europium source and gadolinium source in step (1) are their oxides, hydrates, chlorides or nitrates respectively; said M source is chloride or nitrate of Ca, Sr, Ba or Mg; said boron source is boric acid and/or trimethyl borate.

3. The method of claim 2, wherein said yttrium source, europium source and gadolinium source in step (1) are their oxides or nitrates respectively.

4. The method of claim 2, wherein said M source is a nitrate of Ca or Mg.

5. The method of claim 2, wherein said boron source is trimethyl borate and boric acid, and the mole ratio of trimethyl borate to boric acid is (1–10): (0.5–5).

6. The method of claim 1, wherein said mixing in step (1) is carried out at 60–95° C.

7. The method of claim 6, wherein said mixing in step (1) is carried out in an ultrasonic wave system.

8. The method of claim 1, wherein the microwave power in step (2) is 400–3600 W.

9. The method of claim 1, wherein said heating in step (3) is carried out in a microwave system.

10. The method of claim 1, wherein said washing in step (6) is carried out with the addition of a dispersant.

11. The method of claim 10, wherein said dispersant includes ethanol, propanol and/or butanol.

12. The method of claim 10, wherein said washing is carried out in an ultrasonic wave system.

* * * * *